Figure 1:
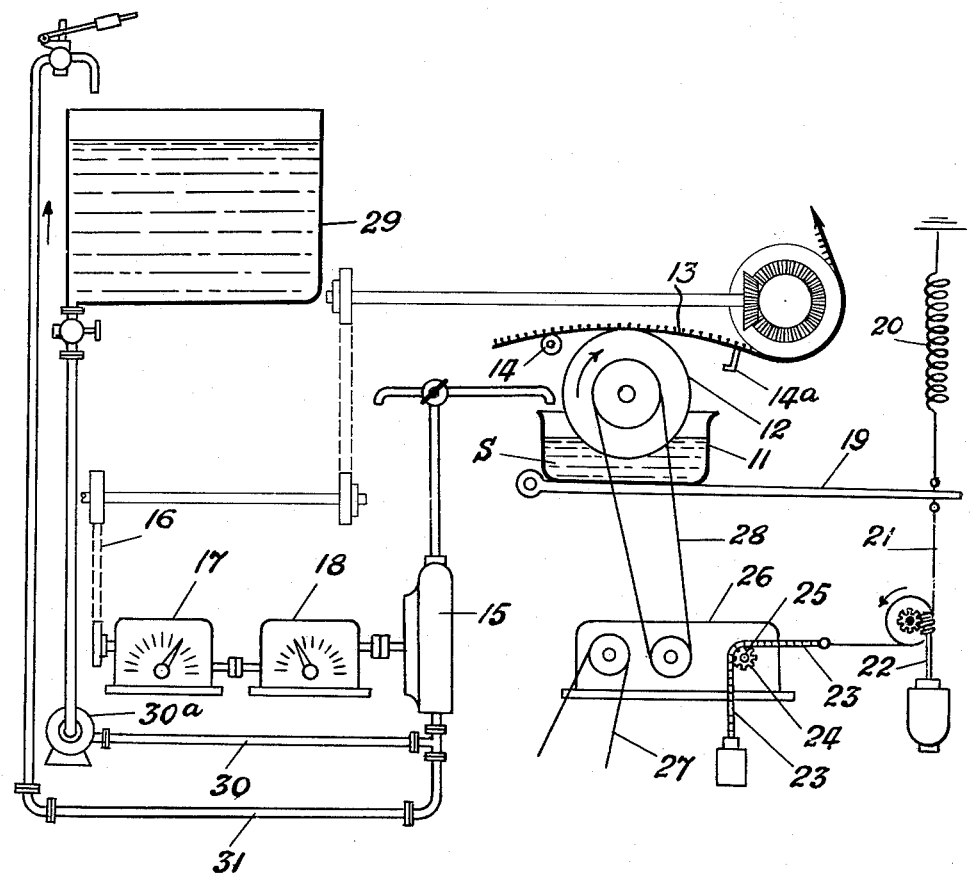

April 25, 1961 E. H. JONES 2,981,638
BACK FILLING OF CARPETS OR LIKE OPERATIONS
Filed Aug. 1, 1957 2 Sheets-Sheet 1

INVENTOR.
ERIC HARDING JONES

BY Frederick Breitenfeld

ATTORNEY

April 25, 1961 E. H. JONES 2,981,638
BACK FILLING OF CARPETS OR LIKE OPERATIONS
Filed Aug. 1, 1957 2 Sheets-Sheet 2

INVENTOR.
ERIC HARDING JONES
BY Frederick Butterfield
ATTORNEY

United States Patent Office 2,981,638
Patented Apr. 25, 1961

2,981,638
BACK FILLING OF CARPETS OR LIKE OPERATIONS

Eric Harding Jones, Bramhall, England, assignor to The British Cotton Industry Research Association, Manchester, England, a British association Filed Aug. 1, 1957, Ser. No. 675,634

6 Claims. (Cl. 117—111)

This invention is concerned with the back filling of carpets and like operations.

In the back filling of a carpet, the carpet, in a length, is passed continuously with its back surface in contact with the upper part of the periphery of a furnishing roller, the lower part of the periphery of which runs in a starch bath. The peripheral speed of the roller and the linear speed of the carpet are usually not equal and, by increasing or decreasing the difference in these speeds, any alteration, due to other factors, in the rate of take-up of starch by the carpet can be compensated for. The rate of take-up can also be controlled by altering the extent of the arc of contact between carpet and roller, or by varying the concentration of the starch in the bath. The concentration should preferably, however, remain substantially constant as undue penetration of the starch may occur if the concentration falls below a certain level. Hitherto control of the rate of take-up has been effected by the machine operator who made the necessary adjustments according to his judgment on examination of the carpet leaving the furnishing roller.

The object of the invention is to provide a method and means for carrying out the back filling of a continuous length of carpet or the like operation, in which the rate of application of starch or the like can be continuously and automatically controlled.

According to the present invention a method of applying to a continuously moving sheet of material a prescribed amount per unit length of a given substance (e.g. starch to the back surface of a carpet) wherein such substance is supplied to a reservoir thereof and from which reservoir it is applied in liquid form to the moving sheet of material by a furnishing roller, is characterised in that the substance is supplied to the reservoir at a rate predetermined by the speed of movement of the sheet of material and the prescribed weight of substance per unit length to be applied thereto, and in that any change in the amount of liquid taken up from the reservoir which results from a deviation of the actual rate of application of the substance from the prescribed rate of application, is utilized to alter the relationship between the moving sheet of material and the furnishing roller so as to correct the deviation.

Change in the amount of liquid taken up by the material may be so utilized in a number of different ways. For example the resultant change in the weight of liquid in the reservoir may be adapted to alter said relationship in the necessary manner. In an alternative method liquid flows continuously from the reservoir to a substantially smaller vessel at a rate dependent upon the rate of take-up of the substance by the material and from which it is recirculated to the reservoir at a constant rate, whereby any change in the amount of liquid taken up from the reservoir is utilized to cause a change in the weight of liquid in the smaller vessel which latter change is then adapted to alter said relationship in the necessary manner. Change in the weight of liquid in a container may of course be ascertained directly, but it may also be ascertained indirectly. In the alternative method just referred to, for instance, change in weight of the liquid in the smaller vessel may be ascertained indirectly from the change in liquid level.

The relationship which is altered will usually be the relative linear speeds of the furnishing roller periphery and the material, for example by altering the roller speed, but the arc of contact between the roller and the material, for example may be the relationship which is altered.

The invention also includes apparatus for applying to a continuously moving sheet of material a prescribed amount per unit length of a given substance (e.g. starch to the back surface of a carpet) comprising a reservoir for such substance in liquid form, and a furnishing roller mounted for rotation with the lower part of its periphery in the reservoir, the upper part of the periphery being adapted to contact one side of the moving sheet of material, characterised by means for supplying the substance to the reservoir at a rate predetermined by the prescribed amount and by the rate of movement of the material, and means responsive in such manner to any change in the rate at which liquid is taken up from the reservoir which results from a deviation of the actual rate of application of the substance from the prescribed rate of application as to operate control means for varying the relationship between the moving sheet of material and the furnishing roller and thereby correct any deviation from the prescribed rate of application of the substance.

The reservoir may be supported on balance means, movement of which is adapted to operate the control means in the necessary manner. Alternatively, the apparatus may further comprise a substantially smaller vessel than the reservoir, means for causing liquid to flow thereto from the reservoir at a rate dependent upon the rate of take up of substance by the material, means for recirculating to the reservoir liquid from the smaller vessel at a constant rate, and balance means on which the smaller vessel is supported, movement of which consequent upon change in the weight of liquid in the smaller vessel due to any change in the amount of liquid taken up from the reservoir is adapted to operate said control means in the necessary manner. Instead of using balance means, float means for the liquid in the smaller vessel may be provided, movement of which is adapted to operate the control means in the necessary manner.

The control means may be adapted to vary the relative linear speeds of the furnishing roller periphery and the carpet, preferably by varying the speed of the furnishing roller.

Figures 2, 3:
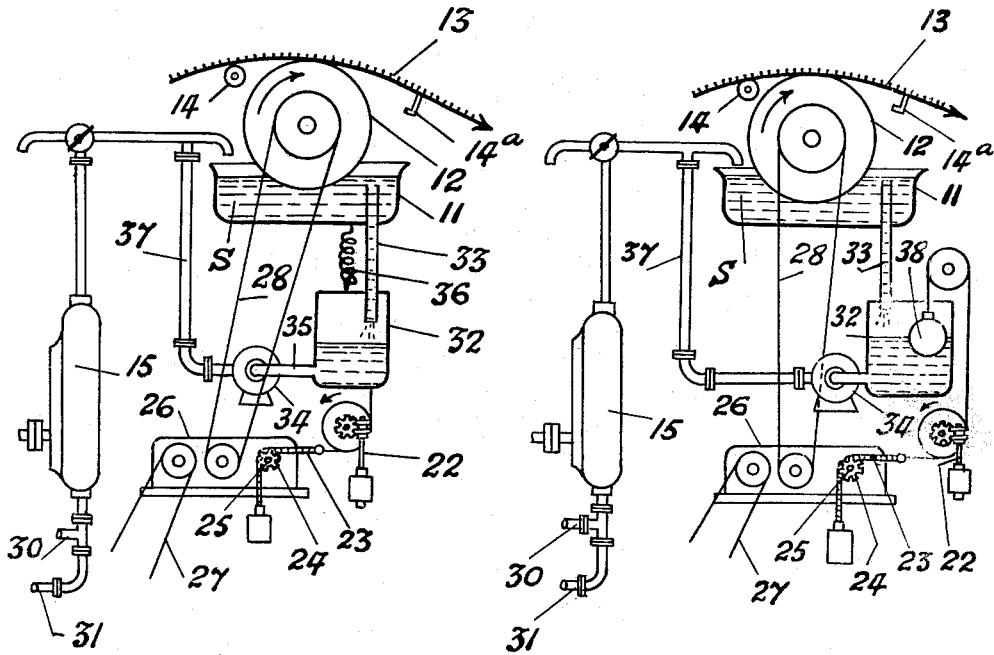

The invention will now be described further, by way of example, with reference to the accompanying drawings, in which, Fig. 1 illustrates diagrammatically an apparatus according to the invention for back filling a carpet, Fig. 2 illustrates diagrammatically a modification of the apparatus illustrated in Fig. 1, and Fig. 3 illustrates diagrammatically a further modification of the apparatus illustrated in Fig. 1.

The main parts of the apparatus illustrated in Fig. 1 are a reservoir 11 for the liquid starch S, a furnishing roller 12 mounted for rotation with the lower part of its periphery within the reservoir 11, a roller 14 and guide 14a whereby a continuously moving length of carpet 13 may be passed over and in contact with the furnishing roller 12, a metering arrangement for feeding starch to the reservoir and a control arrangement for the furnishing roller 12 sensitive to the weight of starch in the reservoir 11.

The metering arrangement consists of a variable speed or variable stroke pump 15 driven by a drive 16 taken from the main machine drive (that is, the drive for progressing the carpet) through two variable speed gears 17, 18. These gears are provided with adjustment means and are calibrated so that the speed or stroke of the pump 15 may be directly adjusted for the supply of starch to the reservoir 11, according to the weight of starch required per square yard of carpet. One gear 17 is calibrated to allow adjustment according to the width of carpet and the other gear 18 is calibrated to allow adjustment according to the weight of size required per square yard of carpet. The pump 15 draws starch from a pipe 30 which is kept replenished with starch from the beck 29 by a circulating pump 30a. The size not removed from pipe 30 by the metering pump 15 is returned to beck 29 by the pipe 31.

In the control arrangement, balance means in the form of a platform 19 is provided, on which the reservoir 11 is supported. The platform 19 is hinged at one end and is normally held in horizontal position by a powerful helical tension spring 20. The spring 20 is rigidly fixed at its upper end whilst its lower end is connected to the free end of the platform 19. From this free end of the platform 19 an inextensible rope 21 passes downwardly over a torque amplifier 22 and is connected to a weighted chain 23 which engages with a chain wheel 24 in such manner that on movement of the platform 19, the consequent movement of the rope 21 is effective through the torque amplifier 22 to turn the chain wheel 24 in one direction or the other. The chain wheel 24 is on the adjustment shaft 25 of a variable speed mechanism 26 driven by a drive 27 taken from the main machine drive through a suitable transmission system. This mechanism is used to drive, through drive 28, the furnishing roller 12, and therefore movement of the platform 19 is adapted in the manner described to vary the speed of the furnishing roller 12. If the reservoir 11 becomes lighter due to excessive take up of starch by the carpet 13 the speed of the roller 12 is decreased consequent upon the upward movement of the platform 19 under the influence of the spring 20, whilst if the rate of take up drops the speed of the furnishing roller 12 is increased.

In operation, the necessary adjustments to the metering arrangement are made to give the required feed of starch S to the reservoir 11 and the machine set in motion. If, due to some external factor such as a deviation of the temperature of the starch from the required temperature, which would affect the viscosity of the starch and its rate of take up by the carpet 13, the speed of the furnishing roller 12 relative to the carpet 13 is altered due to the change in weight of the reservoir 11 and the starch S in the manner previously described so that the rate of take up is corrected quite rapidly.

It will be noted that in this arrangement the control is continuous (as distinct from an on-off control), and hunting can more easily be prevented.

Modified arrangements can be adopted where, as will often be the case, the reservoir 11 is of substantial size and it is therefore inconvenient to use its weight, with that of the starch therein, directly to operate the control means. Fig. 2 shows an arrangement in which the liquid in the reservoir 11 is continuously circulated through a small vessel 32. The reservoir 11 is then fixed in position and is provided with an overflow pipe 33, arranged to allow, when the machine is in operation, an overflow which goes to the small vessel 32 and returned therefrom through pipe 37 at a constant rate by a pump 34 to the reservoir. A flexible pipe 35 is provided between the vessel 32 and the pump 34. The weight of the small vessel 32, with its small amount of liquid can then be used directly to operate the control means.

In the arrangement illustrated the small vessel 32 is suspended on a spring 36 and upward or downward movement adapted to cause movement of a weighted chain 23 and chain wheel 24, the latter being on the adjustment shaft 25 of a variable speed mechanism 26 for the furnishing roller 12. Again, a torque amplifier 22 is used.

In another arrangement (Fig. 3) the small vessel 32 is also fixed in position and the weighted chain controlled by a float 38.

In all three figures corresponding parts are given the same reference numeral.

In both the apparatus of Fig. 2 and of Fig. 3 variation in the rate of take up will cause more or less liquid to flow through the overflow 33 and, therefore, cause more or less liquid to be in the small vessel 32 at any time. This will cause a change in weight and level and the variable speed mechanism to be adjusted in the necessary sense to correct the rate of take up. It is necessary, of course, to prime the system before commencing operations.

Clearly the change in the rate of take up could be adapted, by means of similar mechanism to those described, to alter the speed of the carpet, or the arc of contact of carpet with the furnishing roller, but we believe that alteration of the speed of the furnishing roller is the simplest and least complicated procedure.

What I claim is:

1. A method of applying to a continuously moving web of material a prescribed amount per unit length of a given substance comprising the steps of moving said web in arcuate contact with part of the surface of a driven roller another part of which dips into a reservoir normally containing a prescribed amount of said substance, feeding said substance in liquid form into said reservoir at a rate proportional to the speed of the web, said rate being constant at a constant speed of the web, sensing any variation in the amount of substance in the reservoir from the prescribed amount, and altering the speed of said driven roller upon sensing any variation in the amount of said substance in the reservoir from the prescribed amount in order to compensate for such variation, said alteration being an increase in the speed of said roller when the amount of substance in the reservoir increases above the prescribed amount and a decrease in the speed of said roller when the amount of substance in the reservoir decreases below the prescribed amount.

2. A method of applying to a continuously moving web of material a prescribed amount per unit length of a given substance comprising the steps of moving said web in arcuate contact with part of the surface of a driven roller another part of which dips into a reservoir normally containing a prescribed amount of said substance, feeding said substance in liquid form into said reservoir at a rate proportional to the speed of the web, said rate being constant at a constant speed of the web, causing said substance to flow from said reservoir into a substantially smaller vessel at a rate directly proportional to the amount of substance in said reservoir, said smaller vessel normally containing a prescribed amount of said substance, recirculating said substance to said reservoir at a constant rate, whereby any variation in the amount of substance in said reservoir from the prescribed amount in said reservoir will cause a similar variation in the amount of substance in said smaller vessel from the prescribed amount in said smaller vessel, sensing any variation in the amount of substance in said smaller vessel from the prescribed amount in said smaller vessel, and altering the speed of said driven roller upon sensing any variation in the amount of said substance in said smaller vessel in order to compensate for such variation.

3. A method according to claim 2 wherein said variations are sensed by gauging the level of said substance in said smaller vessel.

4. Apparatus for applying to a continuously moving web of material a prescribed amount per unit length of a given substance comprising a reservoir normally containing a prescribed amount of said substance, a driven furnishing roller mounted for rotation with the lower part of its periphery dipping into said reservoir, means for progressing said web of material with one side thereof in arcuate contact with the upper part of the periphery of said furnishing roller, means for feeding said substance in liquid form into said reservoir at a rate proportional to the speed of said web, said rate being constant at a constant speed of the web, means for sensing any variation in the amount of said substance in said reservoir from the prescribed amount, and means controlled by said sensing means for changing the speed of said driven furnishing roller in order to compensate for such variation.

5. Apparatus for applying to a continuously moving web of material a prescribed amount per unit length of a given substance comprising a reservoir normally containing a prescribed amount of said substance, a driven furnishing roller mounted for rotation with the lower part of its periphery dipping into said reservoir, means for progressing said web of material with one side thereof in arcuate contact with the upper part of the periphery of said furnishing roller, means for feeding said substance in liquid form into said reservoir at a rate proportional to the speed of said web, a vessel substantially smaller than said reservoir and normally containing a prescribed amount of said substance, overflow means for directing said substance from said reservoir to said smaller vessel at a rate directly proportional to the amount of substance in said reservoir, means for recirculating said substance at a constant rate from said smaller vessel to said reservoir, means for sensing any variation in the amount of substance in said smaller vessel from the amount prescribed for said smaller vessel, and means controlled by said sensing means for changing the speed of said driven furnishing roller in order to compensate for said variation.

6. Apparatus according to claim 5 wherein said sensing means is a float responsive to changes in level of said substance in said smaller vessel.

References Cited in the file of this patent

UNITED STATES PATENTS

| | | |
|---|---|---|
| 2,583,267 | Jones et al. | Jan. 22, 1952 |
| 2,623,496 | Lowell | Dec. 30, 1952 |
| 2,694,963 | MacDonald | Nov. 23, 1954 |
| 2,728,690 | Saeman | Dec. 27, 1955 |
| 2,827,873 | Thorn | Mar. 25, 1958 |

FOREIGN PATENTS

| | | |
|---|---|---|
| 448,895 | Italy | Dec. 27, 1949 |

Disclaimer 2,981,638.—*Eric Harding Jones*, Bramhall, England. BACK FILLING OF CARPETS OR LIKE OPERATIONS. Patent dated Apr. 25, 1961. Disclaimer filed June 24, 1963, by the inventor and the assignee, *The Cotton Silk and Man-Made Fibres Research Association*.

Hereby enter this disclaimer to claims 1 and 4 of said patent.

[*Official Gazette September 17, 1963.*]

Notice of Adverse Decision in Interference

In Interference No. 92,610 involving Patent No. 2,981,638, E. H. Jones, Back filling of carpets or like operations, final judgment adverse to the patentee was rendered Aug. 5, 1963, as to claims 1 and 4.
[*Official Gazette February 4, 1964.*]